(12) United States Patent
Seiwert et al.

(10) Patent No.: US 12,480,869 B2
(45) Date of Patent: Nov. 25, 2025

(54) MULTI-WAVELENGTH OZONE CONCENTRATION SENSOR AND METHOD OF USE

(71) Applicant: MKS Inc., Andover, MA (US)

(72) Inventors: Heinrich Johannes Seiwert, Berlin (DE); Felix Groitl, Berlin (DE); Christiane Le Tiec, Berlin (DE); Ulrich Alfred Brammer, Berlin (DE)

(73) Assignee: MKS Inc., Andover, MA (US)

( * ) Notice: Subject to any disclaimer, the term of this patent is extended or adjusted under 35 U.S.C. 154(b) by 831 days.

(21) Appl. No.: 17/486,139

(22) Filed: Sep. 27, 2021

(65) Prior Publication Data

US 2023/0098744 A1 Mar. 30, 2023

(51) Int. Cl.
*G01N 21/33* (2006.01)
*G01N 33/18* (2006.01)

(52) U.S. Cl.
CPC ......... *G01N 21/33* (2013.01); *G01N 33/1893* (2013.01); *Y10T 436/206664* (2015.01)

(58) Field of Classification Search
CPC ............... G01N 21/33; G01N 33/1893; G01N 33/0031; G01N 33/0039; Y10T 436/206664; H01L 33/504
See application file for complete search history.

(56) References Cited

U.S. PATENT DOCUMENTS

| | | |
|---|---|---|
| 2003/0025909 A1 | 2/2003 | Hallstadius |
| 2005/0200848 A1 | 9/2005 | Levine et al. |
| 2013/0270429 A1* | 10/2013 | Bilenko .................. G01N 21/33 250/252.1 |

(Continued)

FOREIGN PATENT DOCUMENTS

| | | |
|---|---|---|
| JP | 2012013573 A2 | 1/2012 |
| JP | 6197093 B1 | 9/2017 |

(Continued)

OTHER PUBLICATIONS

The Search Report issued for PCT counterpart application No. PCT/US2022/043179 dated Jan. 4, 2023 (3 pages).

(Continued)

*Primary Examiner* — Kathryn Elizabeth Limbaugh

(57) ABSTRACT

The present application discloses an apparatus for measuring the concentration of ozone within a fluid and includes a conduit defining at least one passage therein, the conduit has at least one reflective coating selective applied thereto and defining one or more transmission regions on the conduit, a multi-wavelength light source system having at least one light source configured to direct at least one optical signal having a first wavelength through an ozonated fluid within the conduit and at least one UV light source configured to direct at least one UV optical signal having a second wavelength band through the ozonated fluid wherein the optical signal and the UV optical signal traverse through the conduit along different optical paths via at least one reflection from the reflective coating applied to the conduit, and at least one detector positioned proximate to the transmission regions formed on the conduit and configured to detect the optical signal and the UV signal thereby permitting measurement of the concentration of ozone within an ozonated fluid.

44 Claims, 4 Drawing Sheets

(56) References Cited

U.S. PATENT DOCUMENTS

2017/0115272 A1    4/2017   Rihani et al.
2018/0284014 A1   10/2018   Suehiro et al.

FOREIGN PATENT DOCUMENTS

KR    1020140125058 A    10/2014
WO       2019147220 A1    8/2019

OTHER PUBLICATIONS

The Written Opinion issued for PCT counterpart application No. PCT/US2022/043179 dated Jan. 4, 2023 (8 pages).
Extended European Search Report issued for EP Counterpart application No. 22873421.6 dated Jun. 16, 2025 (9 pages).
O'Keeffe, Sinead & Fitzpatrick, Carol & Lewis, Elfed. (2007). An optical fibre based ultra violet and visible absorption spectroscopy system for ozone concentration monitoring. Sensors and Actuators B-chemical—Sensor Actuator B-Chem. 125. 372-378. 10.1016/j.snb.2007.02.023.

\* cited by examiner

MULTI-WAVELENGTH OZONE CONCENTRATION SENSOR AND METHOD OF USE

BACKGROUND

Ozonated water is used in a wide variety of commercial and industrial applications. In the semiconductor manufacturing industry, for example, accurate control of the ozone concentration produced by an ozonated water generator can be critical during device fabrication.

Ozone concentration within ozonated water is often measured via absorption spectroscopy. Ultraviolet (UV) and yellow-red bands of light are suitable due to a good match to all ozone's absorption characteristics. While a number of devices and methods for measuring the concentration of ozone within water have proven to be somewhat useful, a number of shortcomings have been identified. For example, some presently available systems utilize multiple bands of visible light traveling along the same optical path to determine ozone concentration within water. While useful in some applications, accurate analysis of water having low ozone concentration (e.g. less than about 5 ppm) has proven challenging. Typically, the process for measuring ozone concentration is often slow, prone to error, and/or inconvenient. Further, the wavelength of optical signals output by the light source may drift overtime, particularly in UV and near UV wavelengths. As such, the user has no way of diagnosing a change in the accuracy of the concentration measurements based on the UV light source due to the large wavelength separation between the UV light source (e.g. 300 nm) and the yellow-red light source (e.g. 584 nm).

In light of the foregoing, there is an ongoing need for an apparatus offering accurate ozone concentration measurements of ozonated water.

SUMMARY

The present application discloses various embodiments of a multi-wavelength ozone concentration sensor and method of use. More specifically, the application discloses an apparatus using multiple wavelengths of light within different absorption bands of a constituent material. Although the application is directed to measuring the concentration of ozone within an ozonated fluid those skilled in the art will appreciate that the present application may be used to measure the concentration of any variety of compositions within a fluid.

In one embodiment, the present application is directed to an apparatus for measuring the concentration of ozone within a fluid and includes a conduit defining at least one passage therein. The conduit may have at least one coating selective applied thereto. In one embodiment, the coating comprises a reflective coating. In another embodiment, the coating comprises a diffusive coating. Further, one or more transmission regions may be formed on the conduit. The apparatus includes a multi-wavelength light source system having at least one light source configured to direct at least one optical signal having a first wavelength band through an ozonated fluid within the conduit. In addition, the apparatus includes at least one UV light source configured to direct at least one UV optical signal having a second wavelength band through the ozonated fluid. In one embodiment, the optical signal and the UV optical signal traverse through the conduit along different optical paths via at least one reflection from the coating applied to the conduit. Further, the apparatus includes at least one detector positioned proximate to the transmission regions formed on the conduit. During use the detector may be configured to detect the optical signal and the UV signal thereby permitting measurement of the concentration of ozone within an ozonated fluid.

In another embodiment, the present application discloses a method of measuring the concentration of ozone within a fluid and includes the steps of generating at least one optical signal having a wavelength from 400 nm to 700 nm and generating at least one UV optical signal having a wavelength from 200 nm to 400 nm. The optical signal may be directed into a conduit and traverses through the conduit via one or more reflecting sites formed on the conduit. As a result, the optical signal traverses along a first optical path through the conduit. In addition, the UV optical signal is directed into the conduit and traverses through the conduit via one or more reflecting sites formed on the conduit. The UV optical signal traverses along a second optical path through the conduit, wherein the first optical path of the optical signal and second optical path of the UV optical signal are substantially not shared. The optical signal and the UV optical signal are sensed or detected after traversing through an ozonated fluid within the conduit. Thereafter, the concentration of ozone within the ozonated fluid may be modified based on the sensed optical signal and/or the UV optical signal.

In yet another embodiment, the present application discloses an apparatus for measuring a concentration of ozone within fluid, and includes a conduit defining at least one passage therein. The conduit includes at least one reflective or diffusive coating selective applied thereto. One or more transmission regions may be formed on the conduit. In addition, the apparatus includes a multi-wavelength light source system having at least one light source and at least one UV light source in optical communication with the passage of the conduit. In one embodiment, the multi-wavelength light source system is configured to emit a first optical signal having a first peak wavelength and at least a second optical signal having at least a second peak wavelength through an ozonated fluid within the conduit. In addition, the multi-wavelength light source disclosed herein includes at least one UV light source configured to direct a first UV optical signal having a first peak UV wavelength and at least a second UV optical signal having at least a second peak UV wavelength through the ozonated fluid, wherein the first and second optical signals and the first and second UV optical signals traverse through the conduit along different optical paths via at least one reflection from the coating applied to the conduit. In addition, the apparatus includes at least one detector positioned proximate to the transmission region formed on the conduit, wherein the detector may be configured to detect the optical signals and the UV signals for measuring the concentration of ozone within an ozonated fluid.

Other features and advantages of the multi-wavelength concentration sensor and method of use as described herein will become more apparent from a consideration of the following detailed description.

BRIEF DESCRIPTION OF THE DRAWINGS

The novel aspects of the multi-wavelength ozone concentration sensor as disclosed herein will be more apparent from consideration of the following figures, wherein.

DETAILED DESCRIPTION

The present application discloses a multi-wavelength ozone concentration sensor. More specifically, the multi-wavelength ozone concentration sensor utilizes multiple optical paths through a vessel or conduit configured to receive ozonated water therein. The multiple wavelengths of light, traversing along multiple optical paths through the ozonated water, may be used to measure the ozone concentration or constituent within a fluid flowing within a conduit or vessel. In addition, the multiple wavelengths/multiple optical path architecture disclosed herein permits the user to monitor the performance of individual optical sources and preform multi-process parametric analysis in order to maintain a high degree of accuracy of the system.

Various phrases and terms are used throughout this detail description. The term "optical signal" refers to electromagnetic radiation, including infrared, visible, ultraviolet, and x-ray radiation. The terms "optical signal", "light", and "radiation" are herein used interchangeably. "Conduit" refers to a vessel, pipe, or similar body configured to contain at least on fluid therein and/or have one or more fluids flowing therein. "Detector" refers to optical radiation detector, wavelength detector, or optical sensor configured to receive and measure the wavelength, constituent concentration, intensity, power, and/or repetition rate of an optical signal. A "band of light" is associated with a peak frequency and a bandwidth, for example, a half-maximum bandwidth of an optical signal.

Figure 1:
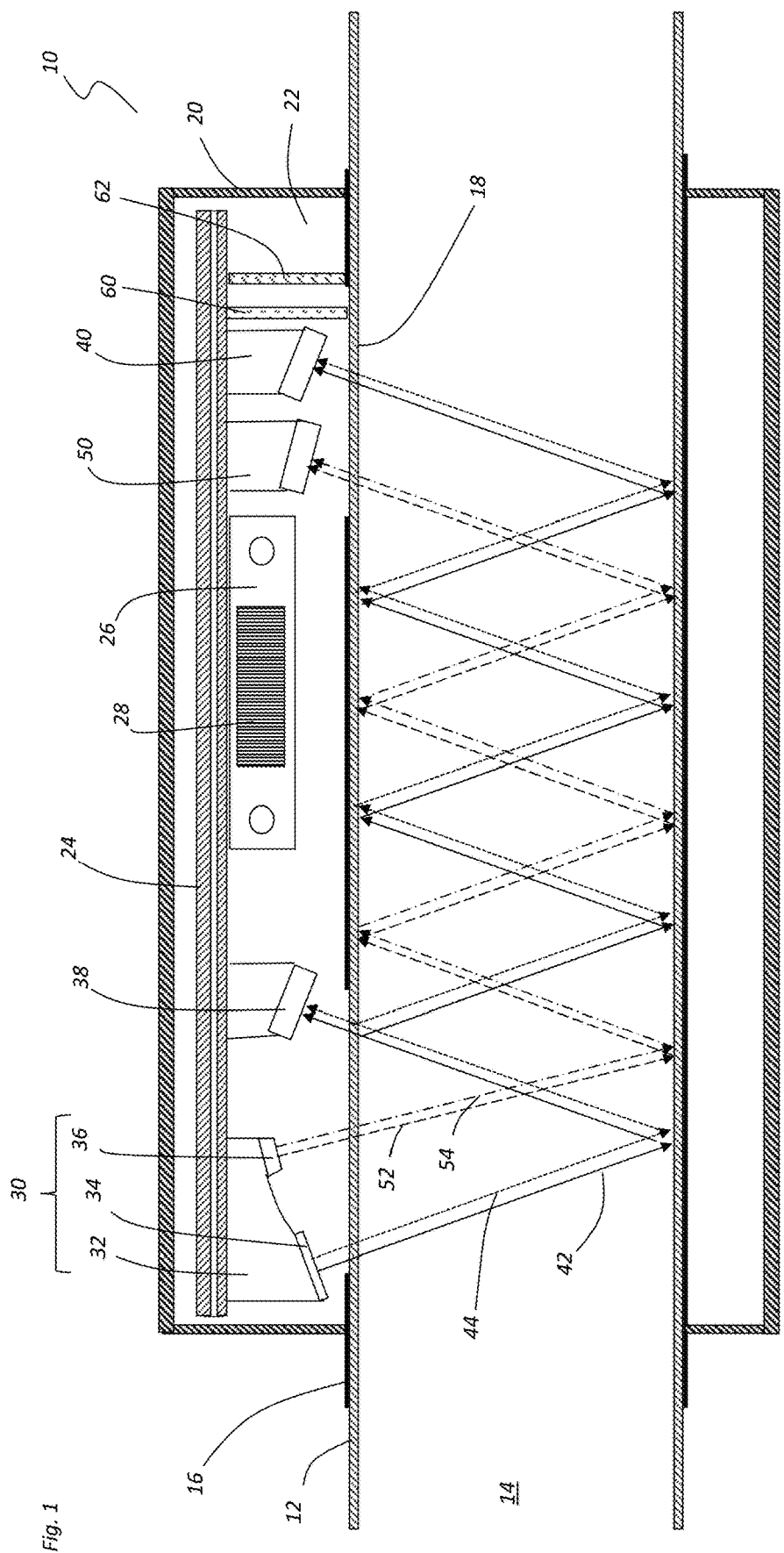
FIG. 1 shows a block diagram of an embodiment of a multi-wavelength ozone concentration sensor for measuring ozone concentration within a fluid, according to the principles of the invention.

FIG. 1 shows an embodiment of a multi-wavelength ozone concentration sensor. As shown, the apparatus 10 includes at least one conduit or vessel 12 defining at least one passage 14 configured to receive at least one fluid therein. In one embodiment, the passage 14 of the conduit 12 is configured to have one or more fluids flowed therethrough. The conduit 12 may be manufactured from any variety of materials. For example, in one embodiment, the conduit 12 is manufactured from transparent material. Optionally, the conduit 12 may be manufactured from translucent and/or opaque materials. Exemplary materials include, without limitations, quartz, sapphire, alumina, silicon carbide, resins, polymers, fluoropolymers, and the like and/or combinations thereof. In one specific embodiment, the conduit 12 is manufactured from polytetrafluoroethylene and perfluoroalkoxy alkanes (PFA). Further, the conduit 12 may be manufactured in any variety of lengths, outside diameters, inside diameters, and the like. For example, in one embodiment the conduit 12 has a length of about 20 mm to about 600 mm. In one specific embodiment, the conduit 12 has a length of about 200 mm. Further, the passage 14 of the conduit 12 may have any variety of inner diameters. For example, in one specific embodiment the inner diameter is about 15 mm to about 22 mm, although those skilled in the art will appreciate that the passage 14 formed in the conduit 12 may have any desired inner diameter.

Referring again to FIG. 1, at least one coating 16 may be selectively applied to at least one surface of the conduit 12, thereby forming one or more transmission areas 18 on the conduit 12. In the illustrated embodiment, the coating 16 is applied to an external surface of the conduit 12. Optionally, the coating 16 may be applied to a surface of the conduit 12 within the passage 14. In one embodiment, the coating 16 may be configured to reflect light traversing through the passage 14 of the conduit 12. Optionally, the coating 16 may provide a diffused reflection. In another embodiment, the coating 16 may comprise a substantially white reflective surface. Further, the coating 16 may be configured to scatter at least one optical signal incident thereon. As such, the coating 16 may include one or more diffusive or light-scattering materials or elements thereon or therein.

As shown in FIG. 1, the apparatus 10 may include one or more measurement bodies or systems 20 positioned on or proximate to at least a portion of the conduit 12. In one embodiment, the measurement body 20 includes at least one body receiver 22 configured to receive at least a portion of the conduit 12 therein. Various components, systems, subsystems, and the like may be positioned within the body receiver 22. In the illustrated embodiment, at least one processor or printed circuit board 24 (hereinafter circuit board 24) may be located within or proximate to the body receiver 22. The circuit board 24 may include various components or devices thereon. In the illustrated embodiment, the circuit board 24 may include at least one power coupling system 26 having at least one connector 28 included therewith. As a result, the circuit board 24 may be configured to provide data to one or more systems or network coupled thereto. Optionally, the circuit board 24 may be configured to couple wirelessly to at least one processor, network, or device. Any variety of additional components, systems, or devices may be included on or in communication with the circuit board 24. Additional optional devices include, without limitations, optical sensors and detectors, optical radiation sources, memory devices, wireless communication devices, bubble detectors, flow detectors, temperature sensors, pressure sensors, and the like.

Referring again to FIG. 1, the apparatus 10 may include at least one multi-wavelength light source system 30 (hereinafter light source system 30) positioned on or in communication with the circuit board 24. The light source system 30 may be configured to output several optical signals each having a discrete wavelength band. In one embodiment, the light source system 30 comprises multiple light sources which may be comprised of multiple light emitting devices (hereinafter emitters) such as light emitting diodes (LEDs), laser diodes, fiber lasers, lasers, and the like each configured to output at least one optical signal within a discrete wavelength band or range. The optical signals emitted from the multi-wavelength light source system 30 may comprise continuous wave optical signals or, in the alternative, pulsed optical signals. For example, in one embodiment the multi-wavelength light source 30 is configured to output multiple optical signals at a variety of frequencies and/or repetition rates at a variety of wavelengths. In one embodiment, the pulse frequency is from about 10 Hz to about 10,000 Hz or more. In another embodiment, the pulse frequency is from about 100 Hz to about 1000 Hz. In the illustrated embodiment, the light source system 30 includes at least one light source body 32 having a first light source 34 and at least a second light source 36 positioned thereon or in communication therewith, although those skilled in the art will appreciate that any number and variety of light sources or emitters may be used with the present system. Further, the light source system 30 need not include a light source body 32.

In the embodiment shown in FIG. 1, the first light source 34 may be configured to output multiple optical signals, each optical signal within a discrete wavelength band. As such, the first light source 34 may include multiple optical emitters. For example, the first light source 34 may be configured to output a first optical signal 42 having a first wavelength band and at least a second optical signal having a second wavelength band. In one embodiment, the first optical signal 42 has a first wavelength band having a peak wavelength of about 590 nm. Optionally, the first wavelength band range from about 570 nm to about 610 nm. Similarly, the second optical signal 44 may have at least a second wavelength band having a peak wavelength of about 470 nm. Optionally, the second optical signal 44 may have a wavelength range from about from about 370 nm to about 650 nm. As such, in one embodiment, the first and second optical signals 42, 44 both lie within the Chappuis electromagnetic radiation absorption band of ozone (hereinafter Chappuis band). Optionally, at least one of the first and second optical signals 42, 44 need not be within the Chappuis band. Those skilled in the art will appreciate that the wavelength bands of the first optical signal 42 and the second optical signal 44 may be configured to have overlapping wavelength ranges. For example, the wavelength ranges may overlap a desired wavelength, such as 584nm. In another embodiment, the wavelength bands of the first optical signal 42 and the second optical signal 44 need not be overlapping.

As shown in FIG. 1, the first and second optical signals 42, 44 traverse along a substantially shared optical path through the passage 14 of the conduit 12, at least a portion of which being reflected by the coating 16 applied to at least one surface of the conduit 12. A first detector 38 may be configured to receive at least a portion of the first and second optical signal 42, 44 transmitted through at least one transmission region 18 formed on the conduit 12. In one embodiment, the first detector 38 may be configured to measure or analyze any variety of characteristics of the first and/or second optical signal 42, 44 including, without limitation, power, spectral density, brightness, scatter, spectral distribution, the like. In one embodiment, the first and/or second optical signals 42, 44 may be used to measure at least one constituent in a fluid flowing. Optionally, the first detector 38 may serve as a reference detector. As such, the first detector 38 may comprise one or more photodiodes, photomultiplier tubes, or other devices known in the art. For example, one embodiment the first detector 38 may comprise multiple photodiodes configured to simultaneously or sequentially measure intensities of the first and second optical signals 42, 44, and/or any additional optical signals used in the apparatus 10. During use, the measured intensity of the first wavelength band of the first optical signal 42 may provide a determination of at least one optical attribute, such as the concentration of a constituent within the fluid (e.g. deionized ozonated water) within the passage 14 of the conduit 12. In addition, measured intensity of the second wavelength band the second optical signal 44 may be configured to provide a reference signal to support error corrections of the attribute determinations. For example, wavelength band of the first optical signal 42 may be selected to permit measurement or sensing ozone concentration greater than about 200 ppm, while the wavelength band of the second optical signal 44 may be selected to permit measurement or sensing ozone concentration greater than about 20 ppm to about 200 ppm. Further, the light source system 30 may include multiple optical sensors, each such measure at least one optical characteristic of at least one of the first and second optical signals 42, 44.

Referring to FIG. 1, at least a portion of the first and second optical signal 42, 44 may be internally reflected by the conduit 12 and traverse along a substantially shared optical path through the passage 14 formed in the conduit 12 via repeated reflections from the coating 16 applied to at least one surface of the conduit 12. As shown, the first and second optical signals 42, 44 may then be transmitted through at least one transmission region 18 formed on the conduit 12. At least a second detector 40 position within or proximate to the measurement body 20 may be configured to receive at least one of the first and second optical signals 42, 44. As such, the second detector 40 may be configured to measure at least one optical characteristic of at least one of the first and second optical signals 42, 44 after traversing through the fluid or material flowing within passage 14 of the conduit 12. In one embodiment, the second detector 40 may be used to measure any variety of optical characteristics, including, spectral intensity, power, brightness, scatter, spectral distribution, and the like. Further, the second detector 40 may be configured to measure the constituent concentration within the fluid flowing through or contained within the conduit 12. As such, the data received from the second detector 40 may be compared to the data received from the first detector 38 thereby permitting the user to comparatively analyze any number of factors such as differential aging of the light sources 34, 36, or the emitters forming light sources 34, 36 of the multi-wavelength light source system 30, bubble detection, scattering, and the like.

As shown in FIG. 1, like the first light source 34, the second light source 36 may be configured to emit multiple optical signals along substantially shared optical path. As shown, the optical signals emitted from the second light source 36 traverse through with the passage 14 of the conduit 12 along a different optical path than the optical signals emitted from first light source 34. In one embodiment, the second light source 36 comprises one or more emitters configured to output one or more ultraviolet (hereinafter UV) optical signals. In the illustrated embodiment the second light source 36 emits a first UV optical signal 52 and at least a second UV optical signal 54. In one embodiment, the first UV optical signal 52 as a peak wavelength of about 265 nm while the second UV optical signal 54 may have a peak wavelength of about 325 nm. Those skilled in the art will appreciate that the first and second UV signals 52, 54 may have a wavelength from about 150 nm to about 400 nm. For example, the first UV optical signal 52 may have a wavelength range within the Hartley electromagnetic radiation absorption band of ozone (hereinafter Hartley band) from about 200 nm to about 310 nm. In another embodiment, the second UV signal 54 may have a wavelength range within the Huggins electromagnetic radiation absorption band of ozone (hereinafter Huggins band) from about 320 nm to about 360 nm. Any variety of UV light sources may be used with the apparatus 10 including, without limitations, LEDs, laser diodes, fibers lasers, and other UV devices known in the art.

Referring again to FIG. 1, the first and second UV optical signals 52, 54 emitted from the second light source 36 traverse through the passage 14 of the conduit 12 along a different optical path than the optical signals 42, 44 emitted by the first light source 34. The first and second UV signals 52, 54 are reflected by the coating 16 applied to the surface of the conduit 12. The first and second UV optical signals 52, 54 may be transmitted through at least one transmission region 18 formed on the conduit 12 to at least one UV detector 50 coupled to or otherwise in communication with the circuit board 24 or various components thereon. In the illustrated embodiment, the UV detector 50 is positioned within the measurement body 20, although skilled in the art will appreciate that the detector 50 may be positioned anywhere proximate to the conduit 12. The UV detector 50 may be configured to receive and analyze one or more UV optical signals received from the second light source 36. For example, the UV detector 50 may be formed from multiple optical detectors or sensors each sensor configured to analyze at least one of the UV optical signals 52, 54 within a desired wavelength range. For example, a portion of the detector 50 may be configured to analyze at least one of the UV optical signals 52, 54 from about 240 nm to about 280 nm while another portion of the UV detector 50 may be configured to analyze at least one of the UV optical signals 52, 54 from about 270 nm to about 325 nm. The number of wavelength ranges may be analyzed with the UV detector 50. In one embodiment, the wavelength sensitivity ranges of the various portions of the UV detector 50 may overlap. In an alternative embodiment, wavelength sensitivity ranges of the various portions of the UV detector 50 need not overlap. Though skilled in art will appreciate any variety of devices may be used to form the UV detector 50. In one embodiment, during use the wavelength band (e.g. Hartley band) of the first UV optical signal 52 may be selected to permit measurement or sensing ozone concentration greater than about 0.02 ppm to about 2 ppm, while the wavelength band (Huggins band) of the second optical signal 54 may be selected to permit measurement or sensing ozone concentration greater than about 2 ppm to about 20 ppm.

In addition, as shown in FIG. 1, the apparatus 10 may include any number of additional sensors, detectors, or other components. The illustrated embodiment, the apparatus 10 includes a first optional sensor 60 and a second optional sensor 62, although those skilled in the art will appreciate that any number of sensors may be included within the measurement body 20 or otherwise used in conjunction with the apparatus. For example, the first optional sensor 60 may comprise a pressure sensor configured to measure pressure of at least one fluid flowing through the passage 14 of the conduit 12. Further, the second optional sensor 62 may comprise at least one temperature sensor configured to measure the temperature of at least one fluid flowing through the passage 14 of the conduit 12.

Figure 2:
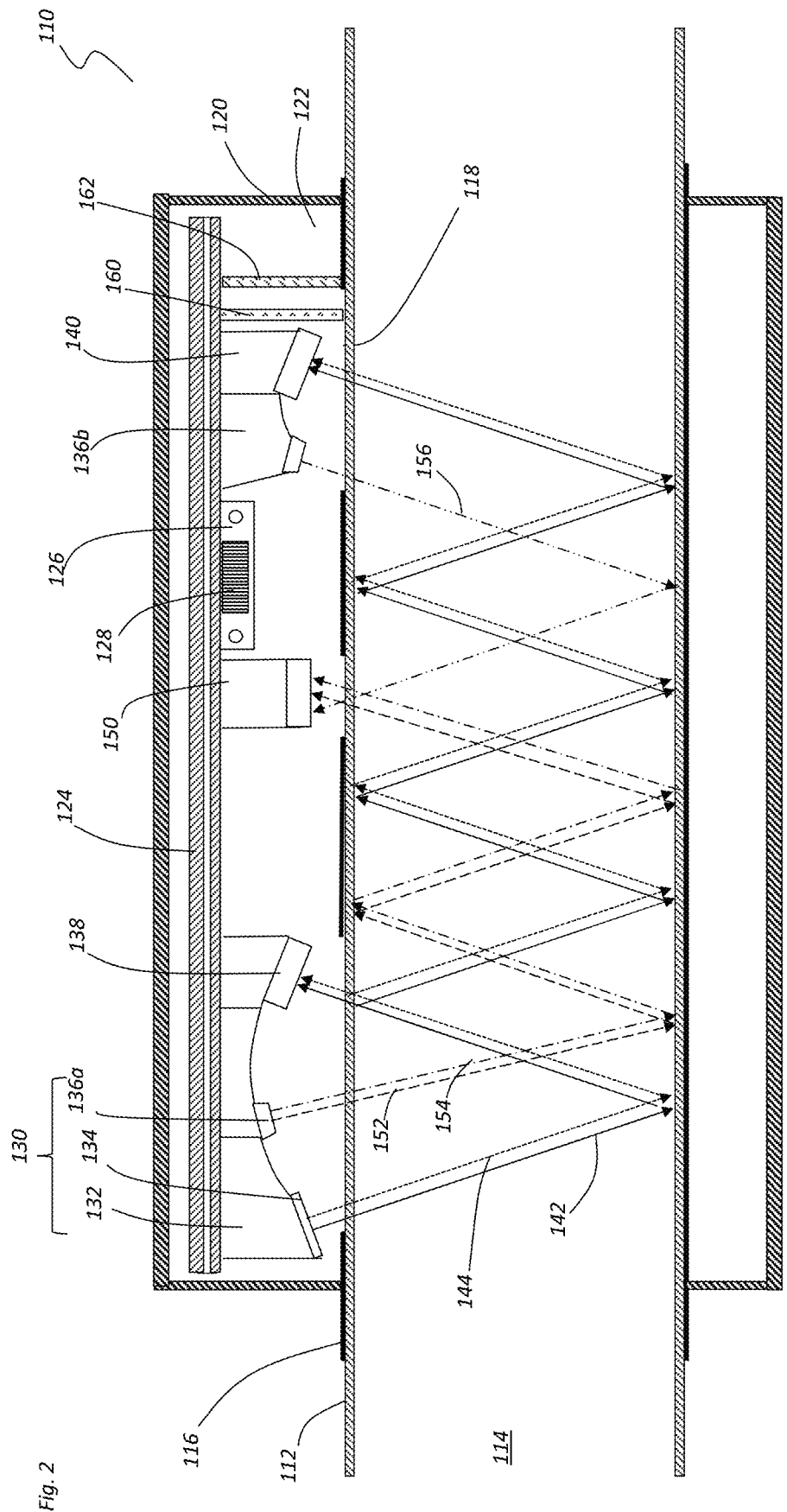
FIG. 2 shows a block diagram of another embodiment of a multi-wavelength ozone concentration sensor for measuring ozone concentration within a fluid, according to the principles of the invention.

FIG. 2 shows another embodiment of a multi-wavelength ozone concentration sensor. In the illustrated embodiment the apparatus 110 may include at least one conduit or vessel 112 defining at least on passage 114 configured to receive at least one fluid therein. Exemplary fluids include, for example, deionized ozonated water, although though skilled in the art will appreciate that any variety of fluids may be used with the apparatus 110. As shown the passage 114 of the conduit 112 may be configured to have one or more fluids flowed therethrough. Like the previous embodiment, the conduit 112 may be manufactured from any variety of materials. For example, in one embodiment, the conduit 112 is manufactured from transparent material. Optionally, the conduit 112 may be manufactured from translucent and/or opaque materials. Exemplary materials include, without limitations, quartz, sapphire, alumina, silicon carbide, resins, polymers, fluoropolymers, and the like and/or combinations thereof. In one specific embodiment, the conduit 112 is manufactured from polytetrafluoroethylene and perfluoroalkoxy alkanes (PFA), although skilled in the art will appreciate that the conduit 112 may be manufactured from any variety of materials. Further, the conduit 112 may be manufactured in any variety of lengths, outside diameters, inside diameters, and the like. For example, in one embodiment the conduit 112 has a length of about 20 mm to about 600 mm. In one specific embodiment, the conduit 112 has a length of about 200 mm. Further, the passage 114 of the conduit 112 may have any variety of inner diameters. For example, in one specific embodiment the inner diameter is about 15 mm to about 22 mm, although those skilled in the art will appreciate that the passage 114 formed in the conduit 112 may have any desired inner diameter.

Referring again to FIG. 2, at least one coating 116 may be selectively applied to at least one surface of the conduit 112, thereby forming one or more transmission areas 118 on a surface of the conduit 112. In the illustrated embodiment, the coating 116 is applied to an external surface of the conduit 112, although those skilled in the art will appreciate that the coating 116 may be applied to a surface of the conduit 112 within the passage 114. In one embodiment, the coating 116 may be configured to reflect at least a portion of at least one optical signal traversing through passage 114 of the conduit 112. Optionally, the coating 116 may provide a diffused reflection. In another embodiment, the coating 116 may comprise a substantially white reflective surface. Further, the coating 116 may be configured to scatter light incident thereon. As such, the coating 116 may include one or more diffusive or light-scattering materials, elements, and/or features thereon or therein.

As shown in FIG. 2, the apparatus 110 may include one or more measurement bodies or systems 120 positioned on or proximate to at least a portion of the conduit 112. Like the previous embodiment, the measurement body 120 may include at least one body receiver 122 configured to receive at least a portion of the conduit 112 therein. Various components, systems, subsystems, and the like may be positioned within the body receiver 122. In the illustrated embodiment, at least one processor or printed circuit board 124 (hereinafter circuit board 124) may be located within or proximate to the body receiver 122. The circuit board 124 may include various components or devices thereon. In the illustrated embodiment, the circuit board 124 may include at least one power coupling system 126 having at least one connector 128 included therewith. Optionally, the circuit board 124 may be configured to provide data to one or more systems or network coupled thereto. Optionally, the circuit board 124 may be configured to couple wirelessly to at least one processor, network, or device. Any variety of additional components, systems, or devices may be included on or in communication with the circuit board 124. Additional optional devices include, without limitations, optical sensors and detectors, optical radiation sources, memory devices, wireless communication devices, bubble detectors, flow detectors, temperature sensors, pressure sensors, and the like.

Referring again to FIG. 2, the apparatus 110 may include at least one multi-wavelength light source system 130 (hereinafter light source system 30) positioned on or in communication with the circuit board 124. The light source system 130 may be configured to output several optical signals each having a discrete wavelength band. In one embodiment, the light source system 130 comprises multiple light sources which may be comprised of multiple light emitting devices (hereinafter emitters) such as light emitting diodes (LEDs), laser diodes, fiber lasers, lasers, and the like each configured to output at least one optical signal with a discrete wavelength band or range. Like the embodiment described above, the optical signals emitted from the multi-wavelength light source system 130 may comprise continuous wave signals or, in the alternative, pulsed optical signals at any variety of pulse frequencies. In the illustrated embodiment, the light source system 130 includes at least one light source body 132 having a first light source 134 and at least a first UV light source 136a positioned thereon or in communication therewith, although those skilled in the art will appreciate that any number and variety of emitters may be used with the present system. Further, the light source system 130 need not include a light source body 132.

As shown in FIG. 2, like the previous embodiment the first light source 134 may be configured to output multiple optical signals, each optical signal within a discrete wavelength band. As such, the first light source 34 may include multiple optical emitters. For example, the first source 134 may be configured to output a first optical signal 142 having a first wavelength band and at least a second optical signal 144 having a second wavelength band. Like the previous embodiment, the first wavelength band and second wavelength band of the first and second optical signals 142, 144, respectively, may both lie within the Chappuis band. For example, the first optical signal 142 may have a peak wavelength of about 590 nm while the second optical signal 144 may have a peak wavelength of about 470 nm. In the alternative, at least one of the first wavelength band and second wavelength band of the first and second optical signals 142, 144, respectively, need not lie within the Chappuis band. Those skilled in the art will appreciate that the wavelength bands of the first optical signal 142 and the second optical signal 44 may be configured to have overlapping wavelength ranges. For example, the wavelength ranges may overlap desired wavelength, such as 584 nm. In another embodiment, the wavelength bands of the first optical signal 142 and the second optical signal 144 need not be overlapping.

As shown in FIG. 2, the first and second optical signals 142, 144 traverse along substantially shared optical path through the passage 114 of the conduit 112, at least a portion of which being reflected by the coating 116 applied to at least one surface of the conduit 112. A first detector 138 may be configured to receive at least a portion of the first and second optical signal 142, 144 transmitted through at least one transmission region 118 formed in the conduit 112. In one embodiment the first detector 138 may be configured to measure or analyze any variety of characteristics of the first and/or second optical signal 142, 144 including, without limitation, power, spectral density, constituent concentration, brightness, scatter, spectral distribution, and the like. Optionally, the first detector 138 may act as a reference detector. As such, the first detector 138 may comprise one or more photodiodes, photo-multiplier tubes, or other devices known in the art. Further, the light source system 130 may comprise multiple optical sensors, each such measure at least one optical of at least one of the first and second optical signals 142, 144. For example, in one embodiment the first detector 138 may comprise multiple photodiodes simultaneously or sequentially measure intensities of the first and second optical signals 142, 144, and/or any additional optical signals used in the apparatus 110. During use, the incorporation of multiple wavelengths used in the apparatus 110 permits the user to extend the range of ozone concentration measurements within the fluid (e.g. deionized ozonated water). For example, wavelength band (Chappuis band) of the first optical signal 142 may be selected to permit measurement or sensing ozone concentration greater than about 200 ppm, while the wavelength band (Chappuis band) of the second optical signal 144 may be selected to permit measurement or sensing ozone concentration greater than about 20 ppm to about 200 ppm.

Referring to FIG. 2, at least a portion of the first and second optical signals 142, 144 may be internally reflected by the conduit 112 traversing along a substantially shared optical path through the passage 114 formed in the conduit 112 via repeated reflections from the coating 116 applied to at least one surface of the conduit 112 . As shown, the first and second optical signals 142, 144 may then be transmitted through at least one transmission region 118 formed on the conduit 112. At least a second detector 140 position within or proximate to the measurement body 120 may be configured to receive and at least one of the first and second optical signals 142, 144. As such, the second detector 140 may be configured to measure at least one optical characteristic of at least one of the first and second optical signals 142, 144 after traversing through the fluid or material flowing within passage 114 of the 112. In one embodiment, the second detector 140 may be used to measure any variety of optical characteristics, including, spectral intensity, power, brightness, scatter, spectral distribution, constituent concentration of the fluid, and the like. As such, the data received from the second detector 140, along with the data received from the first detector 138, may be used to comparatively analyze any number of factors such as differential aging of the light sources 134, 136a, or the emitters forming light sources 134, 136a of the multi-wavelength light source system 130, bubble detection, scattering, constituent concentrations within the fluid, and the like.

As shown in FIG. 2, like the first light source 134, the first UV light source 136a may be configured to emit one or more UV optical signals along substantially shared optical path. In the illustrated embodiment, the first UV light source 136a is shown emitting two UV optical signals 152, 154, although those skilled in the art will appreciate that the first UV light source 136a may emit a single UV optical signal. As shown, the optical signals 152, 154 emitted from the first UV light source 136a traverse through the passage 114 of the conduit 112 along a different optical path than the optical signals 142, 144 emitted from first light source 134. In one embodiment, the first UV light source 136a comprises one or more emitters configured to output one or more ultraviolet (hereinafter UV) optical signals. In the illustrated embodiment the first UV light source 136 emits a first UV optical signal 152 and at least a second UV optical signal 154. In one embodiment, the first UV optical signal 152 as a peak wavelength of about 265 nm. In addition, the second UV optical signal 154 may have a peak wavelength of about 325 nm. Optionally, first UV light source 136a may emit UV optical signals at any range of UV wavelengths. For example, the first UV optical signal 152 may have a wavelength range within the Huggins band while the second UV optical signal 154 may have a wavelength range within the Hartley band. Optionally, the wavelength bands of both the first and second UV optical signals 152, 154 may both be within the Hartley band. In the alternative, the wavelength bands of both the first and second UV optical signals 152, 154 may both be within the Huggins band. Any variety of UV light sources may be used with the apparatus 110 including, without limitations, LEDs, laser diodes, fibers lasers, and other UV devices known in the art.

Referring again to FIG. 2, the first and second UV optical signals 152, 154 emitted from the first UV light source 136a traverse through the passage 114 of the conduit 112 along a different optical path than the optical signals 142, 144 emitted by the first light source 134. The first and second UV signals 152, 154 are reflected by the coating 116 applied to a surface of the conduit 112. The first and second UV optical signals 152, 154 may be transmitted through at least one transmission region 118 formed on the conduit 112 to at least one UV detector 150 coupled to otherwise in communication with the circuit board 124 or various components thereon. The illustrated embodiment, those skilled in the art will appreciate that the UV detector 150 may be positioned anywhere proximate to the conduit 112. The UV detector 150 may be configured to receive and analyze one or more UV optical signals received from the first UV light source 136a. For example, the UV detector 150 may be formed from multiple optical detectors or sensors each sensor configured to analyze at least one of the optical signals 152, 154 within a desired wavelength range. For example, a portion of the UV detector 150 may be configured to analyze at least one of the optical signals 152, 154 from about 200 nm to about 300 nm while another portion of the UV detector 150 may be configured to analyze at least one of the optical signals 152, 154 from about 300 nm to about 360 nm. Any number of wavelength ranges may be analyzed with the UV detector 150. In one embodiment, the wavelength sensitivity ranges of the various portions of the UV detector 150 may overlap. In an alternative embodiment, the wavelength sensitivity ranges of the various portions of the UV detector 150 need not overlap. Though skilled any art will appreciate any variety of devices may be used to form the UV detector 150.

Referring again to FIG. 2, the apparatus 110 may include at least a second UV light source 136b configured to output one or more UV signals 156 at any variety of wavelength bands to the UV detector 150. For example, the second UV light source 136b may be configured to emit at least one UV signal 156 within the Hartley band. In another embodiment, the second UV light source 136b may be configured to emit at least one UV signal 156 within the Huggins band. Optionally, the second UV light source 136b may be configured to emit at least one UV signal 156 having a wavelength band from about 300 nm to about 330 nm. In the illustrated embodiment, the second UV light source 136b is shown outputting a single UV signal 156 to the UV detector 150 although those skilled in the art will appreciate that any number of UV signals in any number of wavelength bands may be emitted from the second UV light source 136b. Further, the UV signal 156 is shown traversing through the conduit 112 along a separate optical path than light signals 142, 144 although those skilled in the art will appreciate that the UV signal 156 may traverse through the conduit 112 along the same optical path as signals 142, 144. The second UV light source 136b may comprise one or more emitters configured to output one or more ultraviolet (hereinafter UV) optical signals. In one embodiment, the UV signal 156 has a wavelength range the same or overlapping the wavelength range of at least one of the UV optical signals 152, 154, although wavelength range of the UV signal 156 need not overlap the wavelength range of at least one of the UV optical signals 152, 154. Any variety of UV light sources may be used to form the second UV light source 136b including, without limitations, LEDs, laser diodes, fibers lasers, and other UV devices known in the art.

Referring again to FIG. 2, the second UV light source signal 156 traverses through the passage 114 of the conduit 112 along a different optical path than the optical signals 142, 144 emitted by the first light source 134 and is incident on the UV detector 150. Again, the UV detector 150 may be configured to receive and analyze one or more UV optical signals received from the second UV light source 136b. In one embodiment, the UV detector 150 may be configured to analyze at least one of the UV optical signals 152, 154, 156. For example, the UV detector 150 may be configured to measure or analyze any variety of characteristics of the UV optical signals 152, 154, 156 including, without limitation, power, spectral density, brightness, scatter, spectral distribution, constituent concentration of the fluid within the passage 114, and the like. As such, the UV detector 150 may comprise one or more photodiodes, photo-multiplier tubes, or other devices known in the art. Further, the UV detector 150 may be configured to compare at least one of the UV optical signals 152, 154, 156 one of the other UV optical signals 152, 154, 156. In one embodiment, the wavelength band (Hartley band) of the first UV optical signal 152 may be selected to permit measurement or sensing ozone concentration of about 0.02 ppm to about 2 ppm, while the wavelength band (Huggins band) of the second optical signal 154 may be selected to permit measurement or sensing ozone concentration greater than about 2 ppm to about 20 ppm. In addition, the wavelength band of the third UV optical signal 156 may be selected to range from about 300 nm to about 330 nm to permit ozone concentration measurement at wavelengths between the Hartley band and the Huggins band.

In addition, as shown in FIG. 2, the apparatus 110 may include any number of additional sensors, detectors, or other components. Like the previous embodiment, the apparatus 110 may include a first optional sensor 160 and a second optional sensor 162 of the any number of sensors may be included within the measurement body 120 or otherwise used in conjunction with the apparatus 110. For example, the first optional sensor 160 may comprise a pressure sensor configured to measure pressure of at least one fluid flowing through the passage 114 of the conduit 112. Further, the second optional sensor 162 may comprise at least one temperature sensor configured to measure the temperature of at least one fluid flowing through the passage 114 of the conduit 112.

Figure 3:
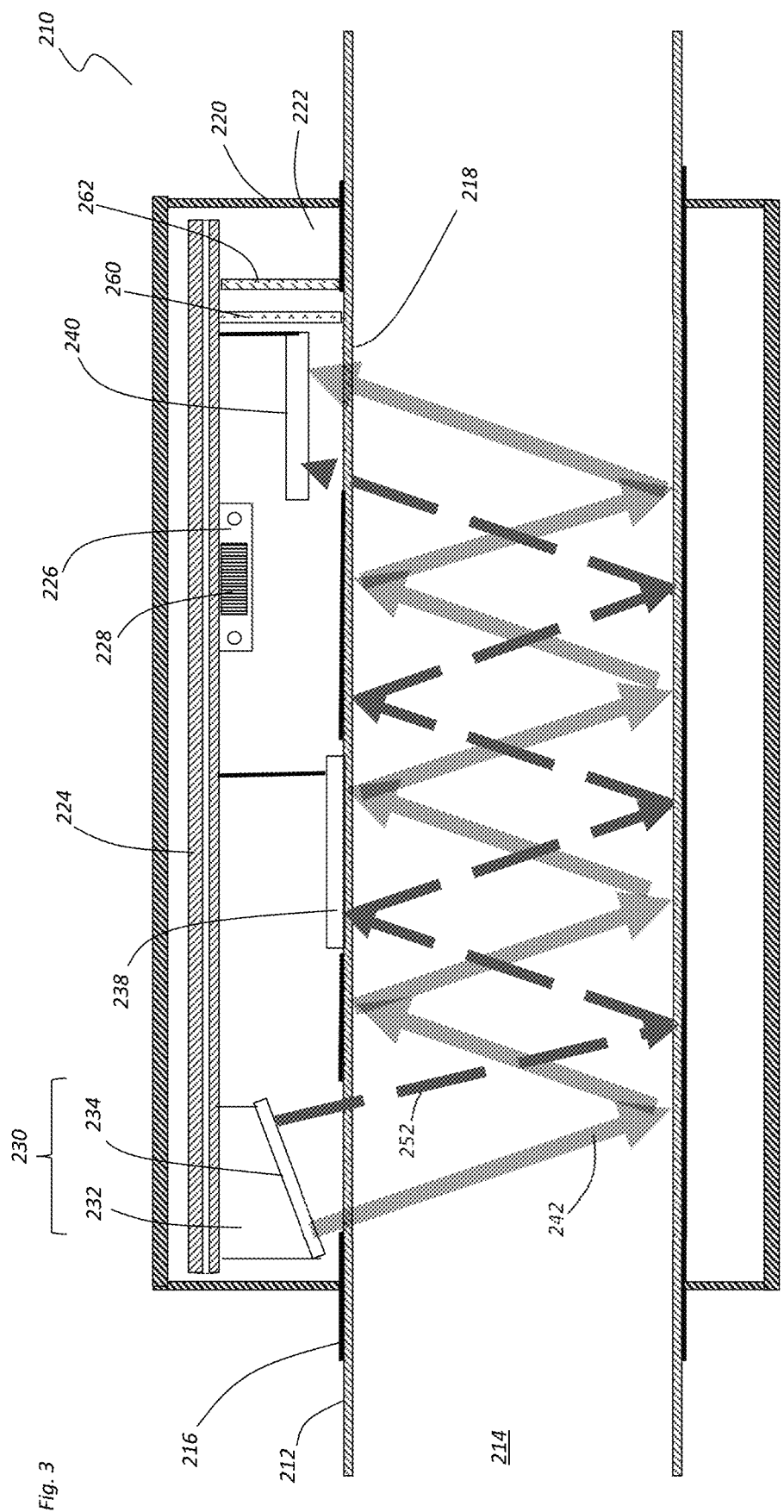
FIG. 3 shows a block diagram of another embodiment of a multi-wavelength ozone concentration sensor for measuring ozone concentration within a fluid, according to the principles of the invention.

FIG. 3 shows yet another embodiment of a multi-wavelength ozone concentration sensor. In the present embodiment, the apparatus 210 includes at least one multi-wavelength light source configured to output one or more optical signals having wavelengths of 400 nm to about 700 nm and one or more UV optical signals having a wavelength of about 100 nm to about 400 nm. Like the previous embodiments, the apparatus 210 includes at least one conduit or vessel 212 defining at least one passage 214 configured to receive at least one fluid therein. Exemplary fluids include, for example, deionized ozonated water, although those skilled in the art will appreciate any variety of fluids may be used with the apparatus 210. As shown the passage 214 of the conduit 212 may be configured to have one or more fluids flowed therethrough. The conduit 212 may be manufactured from any variety of materials, including, without limitations, translucent and/or opaque materials, quartz, sapphire, alumina, silicon carbide, resins, polymers, fluoropolymers, polytetrafluoroethylene, perfluoroalkoxy alkanes (PFA), and the like and/or combinations thereof. Further, the conduit 212 may be manufactured in any variety of lengths, outside diameters, inside diameters, and the like. For example, in one embodiment the conduit 212 has a length of about 20 mm to about 600 mm. In one specific embodiment, the conduit 212 has a length of about 200 mm. Further, the passage 214 of the conduit 212 may have any variety of inner diameters. For example, in one specific embodiment the inner diameter is about 15 mm to about 22 mm, although those skilled in the art will appreciate that the passage 214 formed in the conduit 212 may have any desired inner diameter.

Referring again to FIG. 3, like the previous embodiments at least one coating 216 may be selectively applied to at least one surface of the conduit 212, thereby forming one or more transmission areas 218 on the conduit 212. In the illustrated embodiment, the coating 216 is applied to an external surface of the conduit 212, although those skilled in the art will appreciate that the coating 216 may be applied to a surface of the conduit 212 within the passage 214. In one embodiment, the coating 216 may be configured to reflect at least a portion of the light traversing through passage 214 of the conduit 212. Optionally, the coating 216 may provide a diffused reflection. In another embodiment, the coating 216 may comprise a substantially white reflective surface. Further, the coating 216 may be configured to scatter light incident thereon. As such, the coating 216 may include one or more diffusive or light-scattering materials, elements, and/or features thereon or therein.

As shown in FIG. 3, the apparatus 210 may include one or more measurement bodies or systems 220 defining at least one body receiver 222 therein may be positioned on or proximate to at least a portion of the conduit 212. Like the previous embodiments, the measurement body 220 may be configured to receive at least a portion of the conduit 212 therein. Various components, systems, subsystems, and the like may be positioned within the body receiver 222, including at least one processor or printed circuit board 224 (hereinafter circuit board 224). The circuit board 224 may include various components or devices thereon. In the illustrated embodiment, the circuit board 224 may include at least one power coupling system 226 having at least one connector 228 included therewith. Optionally, the circuit board 224 may be configured to provide data to one or more systems or network coupled thereto. Optionally, the circuit board 224 may be configured to couple wirelessly to at least one processor, network, or device. Any variety of additional components, systems, or devices may be included on or in communication with the circuit board 224. Additional optional devices include, without limitations, optical sensors and detectors, optical radiation sources, memory devices, wireless communication devices, bubble detectors, flow detectors, temperature sensors, pressure sensors, and the like.

Referring again to FIG. 3, the apparatus 210 may include at least one multi-wavelength light source system 230 (hereinafter light source system 230) positioned on or in communication with the circuit board 224. The light source system 230 may be configured to output several optical signals each having a discrete wavelength band. In the illustrated embodiment, the light source system 230 is configured to output at least one optical signal having a wavelength between about 400 nm and 700 nm and at least one UV optical signal having a wavelength between about 200 nm and about 400 nm. As such, the light source system 230 may be comprised of multiple light emitting devices (hereinafter emitters) such as light emitting diodes (LEDs), laser diodes, fiber lasers, lasers, and the like each configured to output at least one optical signal with a discrete wavelength band or range. In the illustrated embodiment, the light source system 230 includes at least one light source body 232 having at least one multi-wavelength emitter 234 positioned thereon or in communication therewith, although those skilled in the art will appreciate that any number and variety of emitters may be used with the present system. Further, the light source system 230 need not include a light source body 232.

As shown in FIG. 3, the light source system 230 may be configured to output one or more visible optical signals 242 having a discrete wavelength in the range of about 350 nm to about 650 nm. For example, the visible optical signal 242 may have peak wavelength of about 590 nm. Optionally, visible optical signal 242 may have another peak wavelength of about 470 nm. Further, the visible optical signal 242 may comprise a white light signal have a broad spectral distribution from about 400 nm to about 700 nm. In addition, the light source system 230 may be configured to output one or more UV optical signals 252 having a discrete wavelength in the range from about 200 nm to about 400 nm. For example, the UV optical signal 242 have a peak wavelength of about 265 nm. In addition, the UV optical signal 252 have additional wavelength peaks of about 288 nm, 300 nm, 310 nm, 325 nm, or any desired UV wavelength. As such, the UV optical signal may have multiple peaks from about 200 nm to about 400 nm, within the Hartley band and Huggins band. In one embodiment, at least one of the visible optical 242 and the UV optical 252 may comprise at least one pulsed optical signal. In another embodiment, at least one of the visible optical 242 in the UV optical 252 may comprise at least one continuous wave optical signal.

As shown in FIG. 3, the visible optical signal 242 and UV optical signal 252 traverse through the passage 214 of the conduit 212 along different optical paths with at least a portion of each being reflected by the coating 216 applied to at least one surface of the conduit 212. A first multi-wavelength detector 238 may be configured to receive at least a portion of at least one of the visible optical signals 242 and the UV optical signal 252 transmitted through at least one transmission region 218 formed in the conduit 212. In one embodiment the first detector 238 may be configured to measure or analyze any variety of characteristics of the visible optical signal 242 and the UV optical signal 252 including, without limitation, power, spectral density, brightness, scatter, spectral distribution, and the like. Optionally, the first detector 238 may act as a reference detector 238. As such, the first detector 238 may comprise one or more photodiodes, photo-multiplier tubes, or other devices known in the art. Further, the light source system 230 may comprise multiple optical sensors, each such measure at least one optical characteristic of at least one of the visible optical signal 242 and the UV optical signal 252. During use, the measured intensity or spectral distribution of the visible optical signal 242 and the UV optical signal 252 may provide a determination of at least one optical attribute, such as concentration of a constituent in the fluid (e.g. deionized ozonated water) within the passage 214 of the conduit 212.

Referring to FIG. 3, at least a second multi-wavelength detector 240 may be positioned downstream of the first multi-wavelength detector 238 and configured to measure or analyze any variety of characteristics of the visible optical signal 242 and the UV optical signal 252 transmitted through a transmission region 218 formed on the conduit 212. For example, the second detector 240 may be configured to measure, without limitation, power, spectral density, brightness, scatter, spectral distribution, constituent concentration within the fluid, and the like. As such, like the first detector 238, the second detector 240 may comprise one or more photodiodes, photo-multiplier tubes, or other devices known in the art. In one specific embodiment, at least one of the first detector 238 and the second detector 240 may comprise an Optoflash™ spectrometer engine manufactured by the Newport Corporation. Like the previous embodiments, the first detector 238 and second detector 240 permit the user to compare at least one optical characteristic of the visible optical signal 242 and the UV optical signal 252. Like the previous embodiments, the first and second detectors 238, 240 may be configured to measure the visible optical signal 242 and UV optical signal 252. For example, at least one of the first and second detectors 238, 240 may be configured to measure the intensity of the visible optical signal 242 from about 400 nm to about 700 nm (e.g. within the Chappuis band) while also measuring the intensity of the UV optical signal 252 from about 200 nm to about 400 nm (e.g. the Hartley band and/or the Huggins band). As such, the apparatus 210 may be capable of measuring constituent concentrations of ozone within the fluid in ranges from about 20 ppm to 200 ppm or more utilizing wavelengths of about 400 nm to about 700 nm (Chappuis band wavelengths) to lower concentration of about 2 ppm to about 20 ppm utilizing wavelengths of about 300 nm to about 400 nm (Huggins band wavelengths) to even lower concentration of about 0.02 ppm to about 2 ppm utilizing wavelengths of about 200 nm to about 300 nm (Hartley band wavelengths) using a single apparatus 210.

In addition, as shown in FIG. 3, apparatus 110 may include any number of additional sensors, detectors, or other components. Like the previous embodiment, the apparatus 210 may include a first optional sensor 260 and a second optional sensor 262 of the any number of sensors may be included within the measurement body 220 or otherwise used in conjunction with the apparatus 210. For example, the first optional sensor 260 may comprise a pressure sensor configured to measure pressure of at least one fluid flowing through the passage 214 of the conduit 212. Further, the second optional sensor 162 may comprise at least one temperature sensor configured to measure the temperature of at least one fluid flowing through the passage 214 of the conduit 212.

Figure 4:
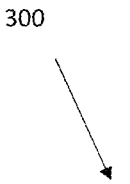
FIG. 4 shows a flowchart of embodiment of a method for measuring the concentration of ozone using a multi-wavelength ozone concentration sensor.

The present application also method of measuring the concentration of ozone in a fluid. As shown in FIG. 4, the method 200 may be implemented using, for example, the devices and systems shown in FIG. 1-3. More specifically, the method 300 includes generating at least one optical signal having a wavelength from about 400 nm to about 700 nm (Step 310). As stated above, wavelengths from about 400 nm to about 700 nm or within the Chappuis electromagnetic radiation absorption band of ozone. In addition, the method 300 includes generating at least one UV optical signal having wavelength from about 200 nm to about 400 nm (Step 320). As stated above, wavelengths from about 200 nm to about 400 nm or within the Hartley electromagnetic radiation absorption band of ozone (about 200 nm to about 310 nm) and Huggins electromagnetic radiation absorption band of ozone (about 300 nm to about 400 nm). Thereafter, the method 300 includes directing one or more optical signals and one or more UV optical signals through an ozonated fluid along optical paths (Step 330). Thereafter, as shown in FIG. 4, the method includes sensing the concentration of ozone within the ozonated fluid based on the characteristic of at least one of the one or more optical signals and one or more UV optical signals (Step 340). Optionally, as shown in Step 350 of FIG. 4, the concentration of ozone within the ozonated fluid may be modified based on the sensed characteristics of at least one of one or more optical signals and one or more UV optical signals. In addition, the method 300 make optionally permits the user to monitor the performance of one or more light sources generating at least one of the one or more optical signals into UV optical signals covering the intensities other optical characteristics of the one or more optical signals in one or more UV optical signals (Step 360). For example, the step of modifying the concentration of ozone within the fluid (Step 350) may include correcting errors relating to measured concentration arising from an intensity loss of at least one of one or more optical signals and one or more UV optical signals associated with one or more factors associated with absorption by ozone. Exemplary non-absorption related errors include, without limitation, bubbles within the fluid, impurities within a fluid, changes in reflectivity within a conduit, variations in the mechanical dimensions of the conduit, wavelength drift of the light sources generating the optical signals and UV optical signals, and the like. As such, as shown in Step 360 of FIG. 4, the user may monitor the performance of one or more of the light sources by comparing the absorption characteristics of ozone at various wavelengths.

The embodiments disclosed herein are illustrative of the principle of the invention. Other modifications may be employed which are within the scope of the invention. Accordingly, the devices disclosed in the present application are not limited to that precisely as shown and describe herein

What is claimed is:

1. An apparatus for measuring a concentration of ozone within a fluid, comprising:
   a conduit defining at least one passage therein, the conduit having at least one coating selectively applied thereto and defining one or more transmission regions on the conduit;
   a multi-wavelength light source system having:
      at least one light source configured to direct at least one initial optical signal having at least a first wavelength range through an ozonated fluid within the conduit; and
      at least one UV light source configured to direct at least one UV optical signal having a second wavelength range through the ozonated fluid;
   wherein the at least one light source and the at least one UV light source are arranged such that the at least one initial optical signal and the at least one UV optical signal traverse through the conduit along different optical paths via respective reflections from the at least one coating of the conduit;
   wherein an optical path of the at least one UV optical signal traversing through the conduit is shorter than an optical path of the at least one initial optical signal traversing through the conduit due to the at least one UV optical signal reflecting off of the at least one coating of the conduit fewer times than the at least one initial optical signal during the traversal through the conduit;
   at least one detector positioned proximate to the at least one transmission region formed on the conduit, the at least one detector configured to detect the at least one initial optical signal and the at least one UV signal for measuring the concentration of ozone within the ozonated fluid.

2. The apparatus of claim 1, wherein the conduit is manufactured from at least one material selected from the group consisting of quarts, sapphire, alumina, silicon carbide, resins, polymers, fluoropolymers, polytetrafluoroethylene, and perfluoroalkoxy alkanes.

3. The apparatus of claim 1, wherein the at least one coating comprises at least one reflective coating configured to reflect optical signals incident thereon.

4. The apparatus of claim 1, wherein the at least one coating includes one or more diffusive materials therein configured to diffusively reflect optical signals incident thereon.

5. The apparatus of claim 1, wherein the at least one initial optical signal comprises a first optical signal and at least a second optical signal, the first optical signal and the at least the second optical signal having a wavelength range from about 400 nm to about 650 nm.

6. The apparatus of claim 5, wherein the first optical signal and the at least the second optical signal having a wavelength range of the Chappuis electromagnetic radiation absorption band of ozone.

7. The apparatus of claim 5, wherein the first optical signal has a peak wavelength of about 590 nm and the at least the second optical signal has a peak wavelength of about 470 nm.

8. The apparatus of claim 5, wherein the wavelength range of the first optical signal and the wavelength range of the at least the second optical signal overlap.

9. The apparatus of claim 1, wherein the at least one UV optical signal comprises a first UV optical signal and at least a second UV optical signal, the first UV optical signal and the at least a second UV optical signal have a wavelength range from about 200 nm to about 400 nm.

10. The apparatus of claim 9, wherein the first UV optical signal has a wavelength of about 200 nm to about 300 nm.

11. The apparatus of claim 9, wherein the first UV optical signal has a wavelength of about 265 nm.

12. The apparatus of claim 9, wherein the at least a second UV optical signal has a wavelength of about 310 nm.

13. The apparatus of claim 9, wherein the at least a second UV optical signal has a wavelength of about 325 nm.

14. The apparatus of claim 9, wherein the wavelength of the first UV optical signal comprises a wavelength within the Hartley electromagnetic radiation absorption band of ozone and the wavelength of the at least a second UV optical signal comprises a wavelength within the Huggins electromagnetic radiation absorption band of ozone.

15. The apparatus of claim 1, wherein the at least one UV optical signal comprises a first UV optical signal and a second UV optical signal, wherein at least one of the first UV optical signal and the second UV optical signal comprises a pulsed optical signal having a pulse repetition rate of about 10 Hz to about 10000 Hz.

16. The apparatus of claim 1, further comprising at least one processor in communication with the multi-wavelength light source system and the at least one detector.

17. The apparatus of claim 1, wherein the at least one detector comprises a first detector and at least a second detector, wherein at least one of the first detector and the at least a second detector are configured to measure the intensity of at least one of the at least one initial optical signal and the at least one UV optical signal.

18. The apparatus of claim 1, further comprising: a first detector configured to measure the intensity of the at least one initial optical signal within a wavelength range from 400 nm to 700 nm; at least a second detector configured to measure the intensity of the at least one initial optical signal within a wavelength range from 400 nm to 700 nm; and at least one UV detector configured to measure the intensity of the at least one UV optical signal within a wavelength range from 200 nm to 400 nm.

19. The apparatus of claim 18, wherein at least one of the first detector and the at least a second detector is configured to detect the at least one initial optical signal and measure at least one attribute within the ozonated fluid, and the at least one UV detector is configured to detect the at least one UV optical signal and measure at least one attribute within the ozonated fluid.

20. A method of measuring a concentration of ozone within a fluid, comprising:
generating at least one initial optical signal having a wavelength from 400 nm to 700 nm via at least one light source;
generating at least one UV optical signal having a wavelength from 200 nm to 400 nm via at least one UV light source;
directing the at least one initial optical signal to traverse through a conduit via one or more reflecting sites formed on the conduit, the at least one initial optical signal traversing along a first optical path through the conduit;
directing the at least one UV optical signal to traverse through the conduit via the one or more reflecting sites formed on the conduit, the at least one UV optical signal traversing along a second optical path through the conduit,
wherein the at least one light source and the at least one UV light source are arranged such that the first optical path of the at least one initial optical signal is longer than the second optical path of the at least one UV optical signal due to the at least one UV optical signal reflecting off of the one or more reflecting sites of the conduit fewer times than the at least one initial optical signal during the traversal through the conduit;
sensing at least one of the at least one initial optical signal and the at least one UV optical signal after traversing through an ozonated fluid; and
modifying the concentration of ozone within the ozonated fluid based on the sensed at least one of the at least one initial optical signal and the at least one UV optical signal.

21. The method of claim 20, wherein the concentration of ozone within the ozonated fluid is modified based on a sensed intensity loss of at least one of the at least one initial optical signal and the at least one UV optical signal.

22. The method of claim 20, wherein the at least one initial optical signal comprises a first optical signal having a peak wavelength of about 590 nm and at least a second optical signal having a peak wavelength of about 470 nm, the first optical signal and the at least the second optical signal being directed through the ozonated fluid along a substantially shared optical path.

23. The method of claim 20, wherein the at least one UV optical signal comprises a first UV optical signal having a peak wavelength of about 265 nm and at least a second UV optical signal having a peak wavelength of about 325 nm, the first UV optical signal and the at least the second UV optical signal being directed through the ozonated fluid along a substantially shared optical path.

24. The method of claim 20, comprising monitoring the performance of one or more light sources by generating the at least one initial optical signal and the at least one UV optical signal and comparing intensities of the at least one initial optical signal to the at least one UV optical signal.

25. The method of claim 20, comprising monitoring the performance of one or more light sources by generating a first UV optical signal and at least a second UV optical signal and comparing intensities of the first UV optical signal to the at least a second UV optical signal.

26. An apparatus for measuring a concentration of ozone within a fluid, comprising:
a conduit defining at least one passage therein, the conduit having at least one coating selectively applied thereto and defining one or more transmission regions on the conduit;

a multi-wavelength light source system having at least one light source and at least one UV light source in optical communication with the at least one passage of the conduit, wherein:
  the multi-wavelength light source system is configured to emit a first optical signal having a first peak wavelength and at least a second optical signal having at least a second peak wavelength through an ozonated fluid within the conduit, and
  the at least one UV light source is configured to direct a first UV optical signal having a first peak UV wavelength and at least a second UV optical signal having at least a second peak UV wavelength through the ozonated fluid,
wherein the at least one light source and the at least one UV light source are arranged such that the first and the at least the second optical signals and the first and the at least a second UV optical signals traverse through the conduit along different optical paths via respective reflections from the at least one coating of the conduit;
wherein an optical path of the first and the at least a second UV optical signals traversing through the conduit is shorter than an optical path of the first and the at least the second optical signals traversing through the conduit due to the first and the at least a second UV optical signals reflecting off of the at least one coating of the conduit fewer times than the first and the at least the second optical signals during the traversal through the conduit; and
at least one detector positioned proximate to the at least one transmission region formed on the conduit, the at least one detector configured to detect the first optical signal, the at least the second optical signal, the first UV optical signal, and the at least a second UV optical signal for measuring the concentration of ozone within an ozonated fluid.

27. The apparatus of claim 26, wherein the conduit is manufactured from at least one material selected from the group consisting of quarts, sapphire, alumina, silicon carbide, resins, polymers, fluoropolymers, polytetrafluoroethylene, and perfluoroalkoxy alkanes.

28. The apparatus of claim 26, wherein the at least one coating comprises at least one reflective coating configured to reflect optical signals incident thereon.

29. The apparatus of claim 26, wherein the at least one coating includes one or more diffusive materials therein configured to diffusively reflect optical signals incident thereon.

30. The apparatus of claim 26, wherein the first optical signal and the at least the second optical signal have a wavelength range from about 400 nm to about 650 nm.

31. The apparatus of claim 26, wherein the first optical signal and the at least the second optical signal have a wavelength range of the Chappuis electromagnetic radiation absorption band of ozone.

32. The apparatus of claim 26, wherein the first optical signal has a peak wavelength of about 590 nm and the at least the second optical signal has a peak wavelength of about 470 nm.

33. The apparatus of claim 26, wherein the wavelength range of the first optical signal and the wavelength range of the at least the second optical signal overlap.

34. The apparatus of claim 26, wherein the first UV optical signal and the at least a second UV optical signal have a wavelength range from about 200 nm to about 400 nm.

35. The apparatus of claim 34, wherein the first UV optical signal has a wavelength of about 200 nm to about 300 nm.

36. The apparatus of claim 34, wherein the first UV optical signal has a wavelength of about 265 nm.

37. The apparatus of claim 34, wherein the at least a second UV optical signal has a wavelength of about 310 nm.

38. The apparatus of claim 34, wherein the at least a second UV optical signal has a wavelength of about 325 nm.

39. The apparatus of claim 34, wherein the wavelength of the first UV optical signal comprises a wavelength within the Hartley electromagnetic radiation absorption band of ozone and the wavelength of the at least a second UV optical signal comprises a wavelength within the Huggins electromagnetic radiation absorption band of ozone.

40. The apparatus of claim 26, wherein at least one of the first UV optical signal and the at least a second UV optical signal comprises a pulsed optical signal having a pulse repetition rate of about 10 Hz to about 10000 Hz.

41. The apparatus of claim 26, further comprising at least one processor in communication with the multi-wavelength light source system and the at least one detector.

42. The apparatus of claim 26, wherein the at least one detector comprises a first detector and a second detector, wherein at least one of the first detector or the second detector are configured to measure the intensity of at least one of the first optical signal, the at least the second optical signal, the first UV optical signal, or the at least a second UV optical signal.

43. The apparatus of claim 26, further comprising: a first detector configured to measure the intensity of at least one of the first optical signal or the at least the second optical signal within a wavelength range from 400 nm to 700 nm; at least a second detector configured to measure the intensity of at least one of the first optical signal or the at least the second optical signal within a wavelength range from 400 nm to 700 nm; and at least one UV detector configured to measure the intensity of at least one of the first UV optical signal or the at least a second UV optical signal within a wavelength range from 200 nm to 400 nm.

44. The apparatus of claim 26, wherein the at least one detector includes a first detector and at least a second detector, wherein at least one of the first detector and the at least a second detector is configured to detect at least one of the first optical signal or the at least the second-optical signal and measure at least one attribute within the ozonated fluid, and at least one UV detector configured to detect at least one of the first UV optical signal or the at least a second UV optical signal and measure at least one attribute within the ozonated fluid.

* * * * *